Patented Aug. 21, 1945

2,383,279

UNITED STATES PATENT OFFICE 2,383,279

DEALKYLATION OF ALKYLPHENOLS

Gordon H. Stillson, Oakmont, Pa., and John B. Fishel, Hagerstown, Md., assignors to Gulf Research & Development Company, Pittsburgh, Pa., a corporation of Delaware No Drawing. Application September 30, 1942, Serial No. 460,308

2 Claims. (Cl. 260—621)

This invention relates to the dealkylation of alkylphenols; and it is particularly concerned with a method of producing phenols and olefins from alkylphenols having one or more alkyl substituents each containing four or more carbon atoms, said method comprising heating such an alkylphenol with a strong phosphoric acid catalyst composition, thereby splitting off the alkyl substituents containing four or more carbon atoms from the phenol nucleus to form mono-olefins with little or no polymerization; all as more fully hereinafter set forth and as claimed.

It is desirable or necessary in various chemical processes to effect dealkylation of alkylphenols having alkyl substituents containing four or more carbon atoms to produce simpler phenols and olefins without extensive polymerization of the olefins produced or objectionable oxidation-reduction side reactions. Typical processes involving such dealkylation are processes in which individual isomeric phenols having closely-spaced boiling points are separated from their mixtures, and processes in which an olefin is separated from a mixture of hydrocarbons by using such mixtures in the alkylation of phenols and subsequently recovering the substantially pure olefin by dealkylation of the alkylated phenol.

Various acid catalysts have been developed for the dealkylation of alkylphenols which are satisfactory in promoting the production of olefins without substantial polymerization. However, it has been found in commercial practice that many of these acid catalysts, particularly the sulfuric acid and modified sulfuric acid type catalysts which have proved most efficient in promoting the reaction, produce extensive corrosion of the metal parts of the apparatus in which such dealkylation is carried out.

It is an object achieved by the present invention to provide an improved method for the dealkylation of alkylphenols having substituents containing four or more carbon atoms, by which an efficiency of reaction may be obtained which is substantially equivalent to that obtained with the sulfuric acid type dealkylation catalysts without substantial polymerization of the olefin produced or excessive corrosion of the metal dealkylation apparatus.

We have found that strong phosphoric acid catalyst compositions are efficient in promoting the dealkylation of alkylphenols having alkyl substituents containing four or more carbon atoms and that these catalysts have little or no tendency to effect polymerization of the olefin products produced, and in effective concentrations for dealkylation do not cause material corrosion of the metal of the apparatus in which such dealkylation is carried out.

Thus by heating an alkylphenol having one or more alkyl substituents each containing four or more carbon atoms, with a relatively small amount of a strong phosphoric acid catalyst composition, dealkylation of the alkylphenol and the production of simpler phenols and olefins is obtained with little or no polymerization or other objectionable side reactions, and a method is provided which may be used commercially with advantage, because substantially no corrosion of the metal parts of the apparatus takes place, while commercial rates of production comparable to those obtained with sulfuric acid dealkylation catalysts can be maintained.

The strong phosphoric acid compositions which we have found suitable as catalysts for the purpose of our invention include tetraphosphoric acid, which is concentrated orthophosphoric acid containing about 82 to 84 per cent of phosphorus pentoxide, and mixtures of tetraphosphoric acid with simple phenols such as phenol, cresols, xylenols and the like; glacial metaphosphoric acid and mixtures of this acid with simple phenols and with phosphorus pentoxide; and mixtures of triaryl phosphates such as triphenyl phosphate or tricresyl phosphate with phosphorus pentoxide.

The amount of these catalysts required to effect dealkylation at a satisfactory rate is relatively small. It varies somewhat with the particular alkylphenol being treated and with the particular catalyst used, but in general we have found that best results are obtained with amounts of dealkylating catalysts between 0.5 and 10.0 per cent by weight of the alkylphenol.

The dealkylation is effected at elevated temperatures by heating a mixture of an alkylphenol and the strong phosphoric acid catalyst composition, advantageously with considerable agitation. Temperatures within the range of 170° to 270° C. are usually required to effect substantially complete dealkylation. Evolution of the olefin produced begins at somewhat lower temperatures and increases as the temperature is raised. Heating is usually continued until evolution of olefins ceases or until the boiling point of the residue indicates that dealkylation has proceeded to the desired point. This point may be the production of a partially dealkylated or a substantially completely dealkylated product. For example, a dealkylphenol may be dealkylated to a mono-alkylphenol or to phenol itself. Little or no tendency to polymerization of the liberated olefins is observed with the strong phosphoric acid catalyst compositions of our invention even when somewhat elevated pressures are used at dealkylating temperatures. It is often desirable therefore, particularly in continuous operation, to effect the dealkylation at somewhat higher pressures, for example 10 to 15 pounds per square inch gage.

It will be understood that in using the terms "dealkylating," "dealkylation" and the like herein and in the appended claims, an operation is referred to in which relatively long-chain alkyl groups such as butyl, amyl or higher are split off from the alkylphenol without removing such methyl, ethyl, or propyl groups as may be present in the alkylphenol.

The strong phosphoric acid catalyst compositions which we have found most advantageous for the purpose of our invention are tetraphosphoric acid and mixtures of tetraphosphoric acid with simple phenols such as phenol, cresols or xylenols. When tetraphosphoric acid is used as the alkylating catalyst, amounts between about 0.5 and 2.0 per cent are usually adequate to produce satisfactory results. With temperatures between about 220° and 250° C. and tetraphosphoric acid concentrations between about 0.5 and 2.0 per cent, yields of olefins corresponding to about 83.0 to 85.0 per cent of the theoretical have been obtained in 2 to 3 hours.

Tetraphosphoric acid requires a brief induction period after it is incorporated in the alkylphenol before active dealkylation begins. This induction period may be completely eliminated by adding, for example, a trace of phenol or cresol to the reaction mixture. In a commercial, large-scale continuous dealkylation process it has been found that the induction period is not apparent, since the used catalyst, containing some of the simple phenols, is recirculated with occasional addition of fresh catalyst.

Catalyst compositions composed of tetraphosphoric acid and a simple phenol have certain advantages over tetraphosphoric acid itself. They are substantially more soluble in many alkylphenols than tetraphosphoric acid, thus affording better contact between the catalyst and the compound to be dealkylated. Also, they do not require any induction period before exerting their dealkylating action which, in some cases, is desirable. Suitable catalyst compositions of this type may be prepared, for example, by stirring together tetraphosphoric acid and phenol, a cresol or a xylenol in proportions of about 2:1 to 1:1 by weight at 120° to 150° C., until solution of the acid in the phenol has been effected. This solution is then dissolved in the alkylphenol to be dealkylated. Amounts of this catalyst composition up to about 10.0 per cent by weight of the alkylphenol may be used if desired.

Glacial metaphosphoric acid, while somewhat less active than tetraphosphoric acid, is also an effective catalyst for the purposes of our invention. The activity of this acid as a catalyst can be substantially increased by mixing with substantial amounts of phosphorus pentoxide. For example, mixtures of equal parts of phosphorus pentoxide and glacial metaphosphoric acid have produced satisfactory dealkylation with little or no tendency to polymerization of the liberated olefin or corrosion of the metal parts of the dealkylation apparatus. The solubility of these catalysts can also be increased by forming mixtures with simple phenols as in the case of the tetraphosphoric acid catalysts.

Catalysts of somewhat similar composition and having effectiveness substantially equal to that of mixtures of tetraphosphoric acid and simple phenols can be formed by mixing phosphorus pentoxide with tricresyl phosphate. Mixtures containing about one part tricresyl phosphate to four parts phosphorus pentoxide have provided particularly good catalysts.

In the following table there are given the results obtained in a series of comparative batch tests designed to show the relative effectiveness of the various strong phosphoric acid catalyst compositions of our invention. In these tests, various alkylphenols in admixture with suitable amounts of the various catalyst compositions were heated in a distillation apparatus until no more olefin was evolved. The liberated olefins were collected and their volume was measured and compared with the total amount of gas theoretically available from complete dealkylation of the alkylphenol. The results obtained were as follows:

| Alkyl phenol and catalyst | Per cent catalyst | Temp., °C. | Time, hrs. | Per cent[1] isobutylene recovered |
|---|---|---|---|---|
| Di-tertiary-butyl-m-cresol and— | | | | |
| Tetraphosphoric acid | 1.0 | 150 | 2.0 | 0 |
| Do | 1.0 | 170 | 1.5 | 29.7 |
| Do | 1.0 | 220 | 2.0 | 83.2 |
| Tetraphosphoric acid+m-cresol (1:1) | 2.0 | 240 | 3.0 | 83.0 |
| Glacial metaphosphoric acid | 1.0 | 250 | 4.0 | 51.3 |
| Glacial metaphosphoric acid+p-cresol (1:1) | 2.0 | 250 | 4.0 | 50.1 |
| Glacial metaphosphoric acid+P₂O₅ (1:1) | 2.0 | 240 | 2.0 | 68.2 |
| Tricresyl phosphate+P₂O₅ (1:2) | 1.0 | 220 | 2.0 | 74.5 |
| Tricresyl phosphate+P₂O₅ (1:4) | 1.0 | 215 | 2.0 | 63.3 |
| Di-tertiary-butyl-p-cresol and— | | | | |
| Tetraphosphoric acid | 1.0 | 250 | 3.0 | 85.0 |
| Tetraphosphoric acid+trace p-cresol | 1.0 | 255 | 2.0 | 73.4 |
| Tetraphosphoric acid+p-cresol (1:1) | 8.0 | 220 | 2.0 | 91.0 |
| Tricresyl phosphate+P₂O₅ (1:4) | 1.0 | 240 | 1.5 | 83.0 |
| Tri-tertiary-butyl-phenol and— | | | | |
| Tetraphosphoric acid | 1.0 | 255 | 3.0 | 57.6 |
| Tetraphosphoric acid+p-cresol (1:1) | 2.0 | 250 | 2.0 | 18.8 |
| Tetraphosphoric acid+p-cresol (1:1) | 10.0 | 220 | 4.0 | 60.7 |
| Tricresyl phosphate+P₂O₅ (1:4) | 1.0 | 190 | 2.0 | 41.6 |

[1] Based on total isobutylene available.

While our invention has been described herein with reference to certain specific embodiments thereof, it is to be understood that the invention is not limited to the details of such embodiments except as hereinafter defined in the appended claims.

What we claim is:

1. A process for producing mono-olefins containing at least four carbon atoms and phenols comprising heating at an elevated temperature below about 270° C., an alkylphenol phenol having an alkyl substituent containing at least four carbon atoms, with a small amount of tetraphosphoric acid.

2. A process of producing mono-olefins containing at least four carbon atoms and phenols comprising heating at a temperature between about 170° C. and 270° C., an alkylphenol having an alkyl substituent containing at least four carbon atoms, with a small amount of tetraphosphoric acid.

GORDON H. STILLSON.
JOHN B. FISHEL.